(12) United States Patent
Miteva et al.

(10) Patent No.: US 7,517,144 B2
(45) Date of Patent: *Apr. 14, 2009

(54) METHOD OF DETERMINING THE TEMPERATURE IN A SYSTEM

(75) Inventors: Tzenka Miteva, Stuttgart (DE); Gabriele Nelles, Stuttgart (DE); Akio Yasuda, Stuttgart (DE); Stanislav Balouchev, Mainz (DE); John Lupton, Neuried (DE)

(73) Assignees: Sony Deutschland GmbH, Cologne (DE); Max-Planck-Gesel. zur Foerderung der Wissen. E.V., Munich (DE)

( * ) Notice: Subject to any disclaimer, the term of this patent is extended or adjusted under 35 U.S.C. 154(b) by 187 days.

This patent is subject to a terminal disclaimer.

(21) Appl. No.: 11/488,670

(22) Filed: Jul. 19, 2006

(65) Prior Publication Data

US 2007/0071064 A1 Mar. 29, 2007

Related U.S. Application Data

(63) Continuation-in-part of application No. 10/639,317, filed on Aug. 12, 2003, now Pat. No. 7,097,354.

(30) Foreign Application Priority Data

Aug. 14, 2002 (EP) .................................. 02018359

(51) Int. Cl.
*G01J 5/00* (2006.01)
*G01K 1/00* (2006.01)
*G01K 15/00* (2006.01)

(52) U.S. Cl. .............................. 374/121; 374/100; 374/1

(58) Field of Classification Search ................ 257/467; 136/253
See application file for complete search history.

(56) References Cited

U.S. PATENT DOCUMENTS

| | | | |
|---|---|---|---|
| 3,679,995 A | 7/1972 | Sorokin | 372/53 |
| 3,723,349 A | 3/1973 | Heseltine et al. | 374/162 |
| 3,960,753 A | 6/1976 | Larrabee | 374/159 |
| 3,988,699 A | 10/1976 | Zachariasse | 372/54 |
| 4,455,741 A | 6/1984 | Kolodner | 374/161 |
| 4,539,473 A | 9/1985 | Brogardh et al. | 374/161 |
| 4,613,237 A | 9/1986 | Melton | 374/162 |
| 4,708,494 A | 11/1987 | Kleinerman | 374/161 |
| 4,791,585 A | 12/1988 | Maki et al. | 356/43 |
| 4,885,633 A | 12/1989 | Buck | 374/162 |

(Continued)

FOREIGN PATENT DOCUMENTS

WO      WO 00 38283      6/2000

OTHER PUBLICATIONS

U.S. Appl. No. 12/099,639, filed Apr. 8, 2008, Miteva, et al.

(Continued)

*Primary Examiner*—Patrick J Assouad
*Assistant Examiner*—Bret Adams
(74) *Attorney, Agent, or Firm*—Oblon, Spivak, McClelland, Maier & Neustadt, P.C.

(57) ABSTRACT

The present invention is related to a method of determining the temperature in a system, said system comprising a molecular heater fraction and a molecular thermometer fraction, and to an integrated system for temperature determination and temporally and spatially resolved thermal profile detection, and to uses of such system.

35 Claims, 15 Drawing Sheets

U.S. PATENT DOCUMENTS

Figure 1A:
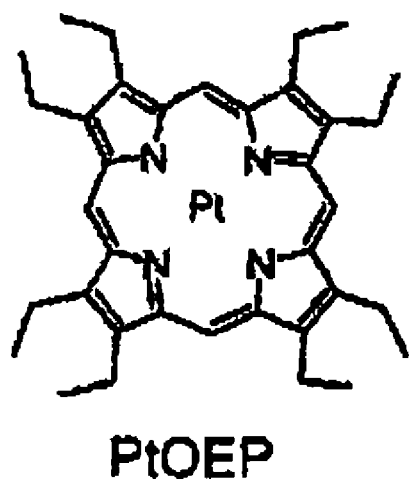

| | | | |
|---|---|---|---|
| 5,172,385 A | 12/1992 | Forrest et al. | 372/50 |
| 5,434,878 A | 7/1995 | Lawandy | 372/43 |
| 5,448,582 A | 9/1995 | Lawandy | 372/42 |
| 5,653,539 A | 8/1997 | Rosengaus | 374/159 |
| 5,677,769 A | 10/1997 | Bendett | 356/440 |
| 5,730,528 A | 3/1998 | Allison et al. | 374/161 |
| 5,820,265 A | 10/1998 | Kleinerman | 374/137 |
| 2002/0110180 A1 | 8/2002 | Barney et al. | 374/161 |
| 2007/0071064 A1 | 3/2007 | Miteva et al. | |

OTHER PUBLICATIONS

I-Yin Sandy Lee et al: "Direct Measurement of Polymer Temperature During Laser Ablation Using a Molecular Thermometer" Journal of Applied Physics, American Institute of Physics, New York, US, vol. 72, No. 6, Sep. 15, 1992, pp. 2440-2448, XP000315554.

PtOEP

METHOD OF DETERMINING THE TEMPERATURE IN A SYSTEM

The present invention is related to a method of determining the temperature in a system, said system comprising a molecular heater fraction and a molecular thermometer fraction, and to an integrated system for temporally and spatially resolved thermal energy detection, and to uses of such system.

Sensors for detecting changes in environmental parameters, for example humidity, the presence of chemical species, such as sugars etc., temperature, and the like, have attracted considerable attention quite recently. In particular, as far as the measurement of temperature is concerned, there exists a body of literature wherein moleculars systems are described that allow for the measurement of temperature and the detection of temperature changes over space and time. For example Chen et al. (*J. Phys. Chem.* 1992, Vol. 96, 7178), Wen et al., (*Chem. Phys. Lett.* 1992, Vol. 192, 315), Okazaki et al. (*J. Phys. Chem. A* 1999, Vol. 103, 9591, *J. Am. Chem. Soc.* 1999, Vol. 121, 5079) describe a system comprising a molecular heater—molecular thermometer system wherein molecular heater molecules are photoexcited and the energy of the photoexcited state is then dissipated to the surrounding matrix by non-radiative transitions as thermal energy. The temperature of the system is then detected via the state of the molecular thermometer molecules by measuring their absorption changes in the system during the process. The molecular heater molecules and the molecular thermometer molecules are distributed in a transparent (e. g. polymer) matrix. In all of the systems described so far, the molecular thermometer molecules have temperature dependent absorption characteristics whereby any change of temperature over space and/or time is detected by a corresponding change in absorption. These systems have been applied for the investigation of thermalization dynamics and to photothermal and photochemical processes (e. g. laser ablation of polymer systems) (Lee et al., *J. Appl. Phys.* 1992, Vol. 72, 2440, Bityurin et al., *J. Appl. Phys. B* 1990, Vol. 51, 17). These systems have further been applied to films with a thickness in the micrometer range or to bulk samples. The spatial resolution of these systems is limited to spot sizes of hundreds of micrometers.

Another approach to measuring the temperature is based on systems which are subjected to optical probing or excitation and which generally are thin films or optical fibres with integrated molecular thermometer molecules. The measurement of the temperature is based on detecting changes with respect to the scattering and reflection properties of the films, changes in birefringence, as well as changes in Raman and Brillouin scattering (Guidotti et al., *Appl. Phys. Lett.* 1992, Vol. 60, 524; T. Sawatari et al., U.S. Pat. No. 6,141,098, 2000; J. L. Fergason, U.S. Pat. No. 5,130,828, 1992). Other temperature sensors are based on the detection of fluorescence at different temperatures, in particular the detection of a temperature dependence of fluorescence decay times (Anghol et al., *Rev. Sci. Inst.* 1991, Vol. 66, 2611, M. Kleinerman, U.S. Pat. No. 5,090,818, 1992), fluorescence intensity ratio (Ister et al., *Anal. Chem.* 1995, Vol. 66, 2788), chemiluminescence (E. Rosengaus, U.S. Pat. No. 5,653,539, 1997), fluorescence intensity (Amao et al., Bull. Chem. Soc. Jpn. 2002, Vol. 75, 389) and temperature dependence of laser emission from scattering media containing a laser dye (N. Lawandy, WO 00/38283, 2000). None of the above described systems allows for in-situ determination and detection of the temperature and the thermal profile in a system with both high spatial and temporal resolution.

Accordingly it has been an object of the present invention to provide a method for temperature determination with higher spatial and temporal resolution. It has furthermore been an object of the invention to provide a method/system allowing an in-situ detection of temperature changes.

These objects are solved by a method of determining a temperature in a system, said system comprising a molecular heater fraction and a molecular thermometer fraction, each of the fractions being integrated into a matrix, wherein said method comprises the following steps:

photoexciting the molecular heater fraction, to heat said system, photoexciting the molecular thermometer fraction, measuring the emission of radiation from the molecular thermometer fraction, determining a temperature of the system based on said measured emitted radiation, wherein said molecular heater fraction is different from said molecular thermometer fraction and/or does not form part thereof, and vice versa.

It should be clear to someone skilled in the art that the order in which said heater fraction and said thermometer fraction are photoexcited can be either way, i.e. the heater fraction may be photoexcited first and thereafter the thermometer fraction or vice versa, or they may be photo-excited concomitantly, i.e. at least with some temporal overlap. In one embodiment, both fractions are photoexcited at the same time.

The objects are also solved by an integrated system for temperature determination and/or temporally and spatially resolved thermal profile detection, comprising a molecular heater fraction and a molecular thermometer fraction, characterized in that the molecular thermometer fraction shows temperature dependent emission characteristics, wherein said molecular heater fraction is different from said molecular thermometer fraction and/or does not from part-thereof, and vice versa.

In one embodiment, said molecular heater fraction comprises a first chemical species or a first group of chemical species, and said molecular thermometer fraction comprises a second chemical species or a second group of chemical species, and wherein said first chemical species or first group of chemical species is different from said second chemical species or said second group of chemical species.

Preferably, the molecular heater fraction and the molecular thermometer fraction are integrated into a common matrix.

As used herein, the terms "to detect" and "to measure" are used interchangeably herein. They are meant to denote the qualitative and/or quantitative determination of an entity. Preferably, such terms are used to refer to a quantitative determination of an entity.

As used herein, the term "species" is meant to signify elemental substance matter, or a chemical compound or a mixture of any of the foregoing.

In one embodiment of the method according to the present invention, the molecular heater fraction is integrated into a matrix and forms a molecular heater layer and the molecular thermometer fraction is integrated into a matrix and forms a molecular thermometer layer.

Preferably, the system comprises at least one molecular heater layer and at least one molecular thermometer layer, wherein preferably the system comprises two or more molecular heater layers and two or more molecular thermometer layers.

In one embodiment of the method according to the present invention, the molecular heater layers and the molecular thermometer layers are arranged in alternating order.

In one embodiment of the method according to the present invention, the molecular heater layer is a multilayer.

Preferably, photoexciting the molecular heater fraction occurs by irradiating with wavelengths in the range from 220 nm to 1064 nm, wherein preferably it occurs by irradiating with wavelengths in the range from 300-700 nm.

In one embodiment of the method according to the present invention, the molecular thermometer fraction has emission characteristics that are temperature dependent.

Preferably, the molecular thermometer fraction is provided: by molecules of one chemical species said molecules having two or more emission bands the population of which is temperature dependent, by molecules of two different chemical species each species having a temperature dependent emission that is different from that of the other species, and/or by molecules having thermally activated bands.

In one embodiment of the method according to the present invention, the emission of the molecular thermometer fraction is measured by measurements of luminescence intensity ratio, wherein preferably the luminescence intensity ratio is the ratio of luminescence intensity at two different wavelengths.

Preferably the luminescence is selected from the group comprising fluorescence and phosphorescence.

In one embodiment of the method according to the present invention, the matrix is luminescent.

In one embodiment of the method according to the present invention, the lifetime(s) of the excited state(s) of the molecular thermometer fraction is (are) in the range from ps to µs, wherein preferably the lifetime(s) of the excited state(s) of the molecular thermometer fraction is (are) greater than the lifetime(s) of the excited state(s) of the matrix.

In one embodiment of the method according to the present invention, the photoexcitation is caused by continuous excitation or by pulsed excitation.

Preferably, the molecular heater fraction is provided by photosensitive molecules.

In one embodiment of the method according to the present invention, the photoexcitation is achieved using polarised radiation, wherein preferably the polarised radiation is linearly or circularly polarised radiation or both.

In one embodiment of the method according to the present invention, anisotropic molecules are used as the molecular heater/thermometer fraction, wherein preferably the anisotropic molecules are photoaddressable, wherein even more preferably the photoadressable anisotropic molecules are used as molecular heaters.

In one embodiment of the method according to the present invention, the molecular heater fraction is provided by a dye or combination of dyes selected from the group comprising any kind of conjugated small molecules and polymers with absorption suited to the wavelength of interest, in particular fulgides, diarylethenes, spiropyrans, azobenzenes, stylbenes, "donor-acceptor" groups and any polymer containing any of the aforementioned groups.

The fulgides, diarylethenes, spiropyrans, azobenzenes, stylbenes, "donor-acceptor" groups and any polymer containing any of the aforementioned groups are specific examples of photosensitive molecular heater molecules.

In one embodiment of the method according to the present invention, the molecular thermometer fraction is provided by a dye or combination of dyes selected from the group comprising porphyrins, metallo-porphyrins, fluorenes, and triphenylamines. In general, as molecular thermometer fraction any emissive dye with thermally activated band(s) or any combination of at least two emissive dye can be used, whose intensity of luminescence varies with temperature.

Preferably, the method according to the present invention comprises a calibration step:
Performing a calibration of said system by
photoexciting the molecular thermometer fraction,
measuring emission of radiation from the photoexcited molecular thermometer fraction at least two different temperatures of the system,
measuring said at least two different temperatures of the system using an external means for measuring said temperatures, and
correlating said measured emitted radiation with its corresponding temperature of the system, wherein, preferably, said emission of radiation from the photoexcited molecular thermometer fraction is measured at a plurality of temperatures of the system and said plurality of temperatures are measured using an external means for measuring said temperatures.

Preferably, said external means for measuring said temperatures is a thermometer or a temperature probe or a temperature sensor.

In one embodiment, after correlating said measured emitted radiation with its corresponding temperature of the system, said correlation is represented as a plot of measured emitted radiation from the photoexcited molecular thermometer faction versus temperature of the system.

It is clear to someone skilled in the art that from this operation a plot results which may be referred to as a "calibration curve". Likewise, the same information may be represented by an appropriate mathematical equation, for example in same cases by a linear equation of the form $y=mx+b$. In any case, it is clear to someone skilled in the art that the information obtained from such correlation allows the experimenter to interpolate or extrapolate and to determine the temperature from any measured emitted radiation from the photoexcited molecular thermometer fraction. Likewise it is clear to someone skilled in the art that the data obtained may not necessarily have a linear relationship, but for reasons of simplicity, this example has been given to illustrate the purpose of such correlation step.

In one embodiment said calibration step is performed prior to the step of photoexciting the molecular heater fraction as recited in claim 1, or after the step of determining a temperature of the system as recited in claim 1.

In one embodiment, said calibration step is performed independently of any of the steps recited in claim 1. It is clear to someone skilled in the art that for a particular setup or system, one does not need to perform a calibration every time that actual measurements are to be performed. Rather, in many instances, it will be perfectly possible to perform a calibration operation once, as described above, and thereafter use such calibration for a number of subsequent measurements. This is also what is implied by the term of performing the calibration step independently of any of the other steps recited in claim 1.

In one embodiment, said emission of radiation from the photoexcited thermometer fraction in said calibration step is measured as luminescence intensity ratio, wherein said luminescence intensity ratio is the ratio of luminescence at two different wavelengths.

In one embodiment of the method according to the present invention, said photoexciting the molecular heater fraction (during the actual determination of a temperature in a system), occurs at the same wavelength as the subsequent step of photoexciting the molecular thermometer fraction (again during the actual method of determining a temperature in a system, as opposed to the calibration process described above). It should be clear to someone skilled in the art that both the actual measurement of a temperature in a system involves a photoexcitation of the molecular thermometer fraction, as well as the calibration process which also involves a photoexcitation of the molecular thermometer fraction. In both instances, the purpose of photoexcitation is to cause an emission of radiation from the molecular thermometer fraction thus photoexcited.

In another embodiment of the method according to the present invention, said photoexciting the molecular heater fraction occurs at a different wavelength to said photoexciting the molecular thermometer fraction, wherein, preferably, said wavelength for photoexciting said molecular heater fraction is greater than said wavelength for photoexciting said molecular thermometer fraction.

In one embodiment of the system according to the present invention, the molecular thermometer fraction is provided: by molecules of one chemical species said molecules having two or more emission bands the population of which is temperate dependent, by molecules of two different chemical species each species having a temperature dependent emission that is different from that of the other species, and/or by molecules having thermally activated bands.

Preferably, the temperature dependent emission characteristic of the molecular thermometer fraction is luminescence intensity, wherein preferably the ratio of luminescence intensity at two different wavelengths is temperature dependent.

In one embodiment of the system according to the present invention, the molecular heater fraction is provided by molecules selected from the group comprising any kind of conjugated small molecules and polymers with absorption suited to the wavelength of interest, in particular fulgides, diarylethenes, spiropyrans, azobenzenes, stylbenes, "donor-acceptor" groups and any polymer containing any of the aforementioned groups.

In one embodiment of the system according to the present invention, the molecular thermometer fraction is provided by molecules selected from the group comprising porphyrins, metallo-porphyrins, fluorenes, and triphenylamines. In general, as molecular thermometer fraction any emissive dye with thermally activated band(s) or any combination of at least two emissive dye can be used, whose intensity of luminescence varies with temperature.

In one embodiment of the system according to the present invention, the molecular heater fraction and the molecular thermometer fraction are integrated into a common matrix.

In one embodiment of the system according to the present invention, the molecular heater fraction is integrated into a matrix forming a molecular heater layer, and the molecular thermometer fraction is integrated into a matrix forming a molecular thermometer layer.

In one embodiment of the system according to the present invention, the system comprises at least one molecular heater layer and at least one molecular thermometer layer, wherein preferably the system comprises two or more molecular heater layers and two or more molecular thermometer layers.

In one embodiment of the system according to the present invention, the molecular heater layers and the molecular thermometer layers are arranged in alternating order.

In one embodiment of the system according to the present invention, the molecular heater layer is a multilayer.

Preferably, the molecular heater fraction and/or the molecular thermometer fraction is provided by molecules which are photosensitive.

In one embodiment of the system according to the present invention, the molecular heater fraction and/or the molecular thermometer fraction is provided by molecules which are anisotropic, wherein preferably the anisotropic molecules are photoaddressable.

In one embodiment of the system according to the present invention, the molecular heater fraction is provided by molecules selected from the group comprising any kind of conjugated small molecules and polymers with absorption suited to the wavelength of interest, in particular fulgides, diarylethenes, spiropyrans, azobenzenes, stylbenes, "donor-acceptor" groups and any polymer containing any of the aforementioned groups.

The fulgides, diarylethenes, spiropyrans, azobenzenes, stylbenes, "donor-acceptor" groups and any polymer containing any of the aforementioned groups are specific examples of photosensitive molecular heater molecules.

In one embodiment of the system according to the present invention, the molecular thermometer fraction is provided by molecules selected from the group comprising porphyrins, metallo-porphyrins, fluorenes, and triphenylamines. In general, as molecular thermometer fraction any emissive dye with thermally activated band(s) or any combination of at least two emissive dye can be used, whose intensity of luminescence varies with temperature.

The objects of the present invention are also solved by the use of an integrated system according to the present invention for temporally and spatially resolved temperature determination, and by the use of an integrated system according to the present invention in an opto-electronic device.

In a system according to the present invention and by using a method according to the present invention one basically achieves wavelength independence as well as an independence of the intensity of the excitation source. Because the method according to the present invention is based on temperature dependent emission characteristics, in particular on emission intensity ratio, this allows a precise measurement of the temporal and spatial distribution of the thermal profile. For example by using a suitable sequence of high- and low intensity pulses (example 3) an extremely high time resolution up into the nanoseconds range is possible. Furthermore the system is an all-optical system and because of all components being integrated it allows in-situ-measurements at the relevant place of action where one wants to provide information on the thermal profile distribution. Because of the big variety of thermometer molecules which can be used and which have excited state lifetimes from ps to µs, temperature measurements can be made in emissive matrices (choosing the life-time of the thermometer molecule to be longer enough than that of the matrix) by employing a gated detection technique.

In terms of the spatial resolution the spots that can be measured are only diffraction limited and so a spatial resolution as high as approximately the wavelength used can be achieved. Another option to allow a very precise determination of the temporal and spatial thermal profile distribution is the use of photosensitive or photoaddressable molecules as heaters. (See also example 4)

Furthermore the described all-optical method/system allows for a sensitive and precise temperature determination and thermal profile distribution detection under light irradiation hitherto not known in the state of the art.

As used herein the term "molecular heater" is meant to encompass any elemental substance matter, chemical compound or mixture of chemical compounds and/or elemental substance matter that has a photoexcited state which relaxes quickly to the lower state to generate a large excess energy instantaneously which is dissipated as thermal energy. As used herein the term "molecular thermometer" is meant to encompass any elemental substance matter, chemical compound or mixture of chemical compounds and/or elemental substance matter whose fluorescence and/or phosphorescence emission intensity characteristics are temperature dependent.

The molecular heater fraction and the molecular thermometer fraction, as used herein, are different entities and have no overlap in identity in terms of their composition, preferably in terms of their respective components (elemental substance, chemical compound or mixture of the foregoing) that make up the heater fraction and the thermometer fraction.

It should be clear to someone skilled in the art that the term "molecular heater fraction" implies that such fraction is provided with the purpose of being intentionally used for heating the system in which said heater fraction resides.

As used herein the term "fraction" in connection with the term "molecular heater" and/or the term "molecular thermometer" is meant to signify a component in the system.

The term "determining the temperature" is meant to signify adjusting and/or measuring the temperature in a system.

As used herein the term "photosensitive molecules" is meant to signify molecules which change their absorption characteristics under light irradiation. "Luminescence" as used herein can be fluorescence or phosphorescence or a combination of both.

As used herein the term "photoaddressable" is meant to signify the capability of a molecule to change its orientation when irradiated with light of the appropriate wavelength and/or polarization (linear or circular polarisation or both).

The system and the method according to the present invention can be successfully applied in processes as diverse as fabrication of optical discs, or any opto-electronic device, and allows for a precise determination of the temperature profile in-situ with unparalleled resolution.

It can be successfully applied under various environmental conditions such as a wide range of pressures, temperatures etc.

Reference is now made to the figures, wherein

Figure 1B:
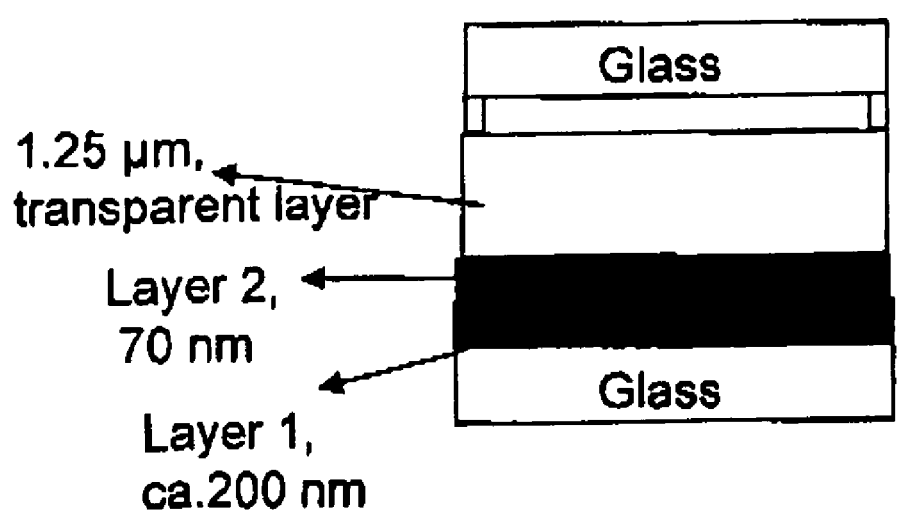
Figure 1C:
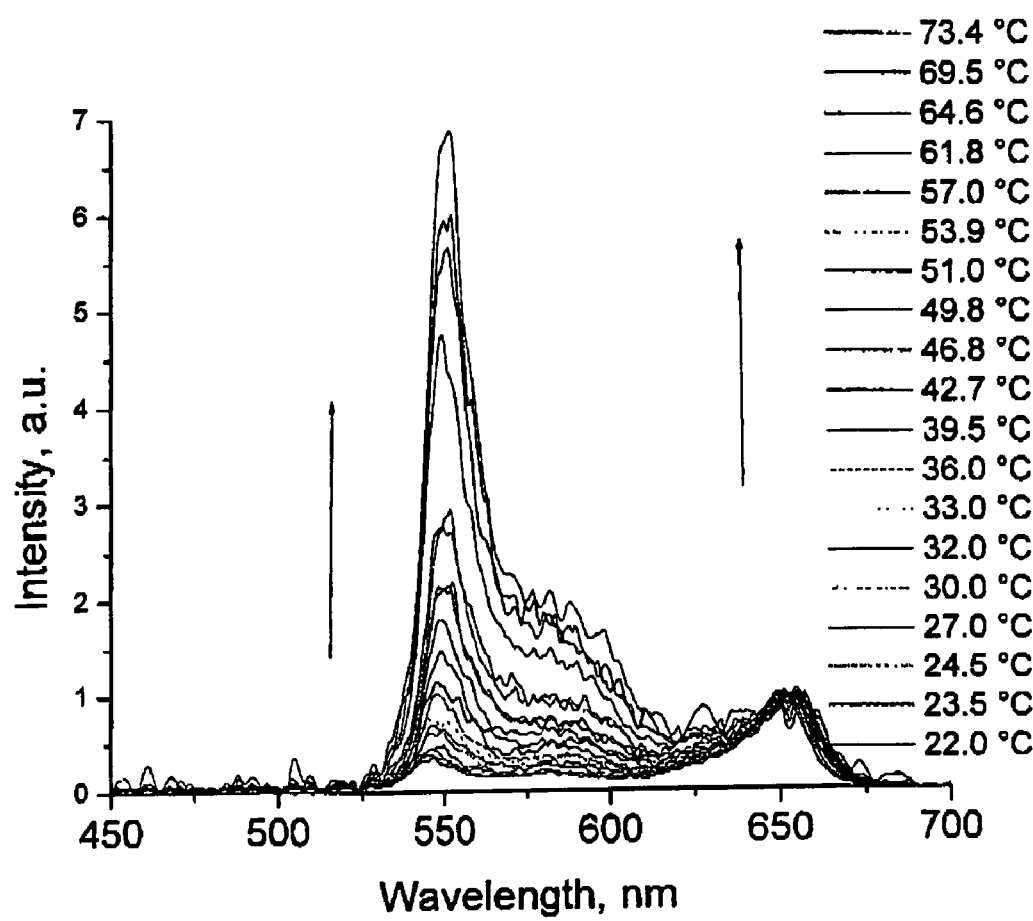
Figure 1D:
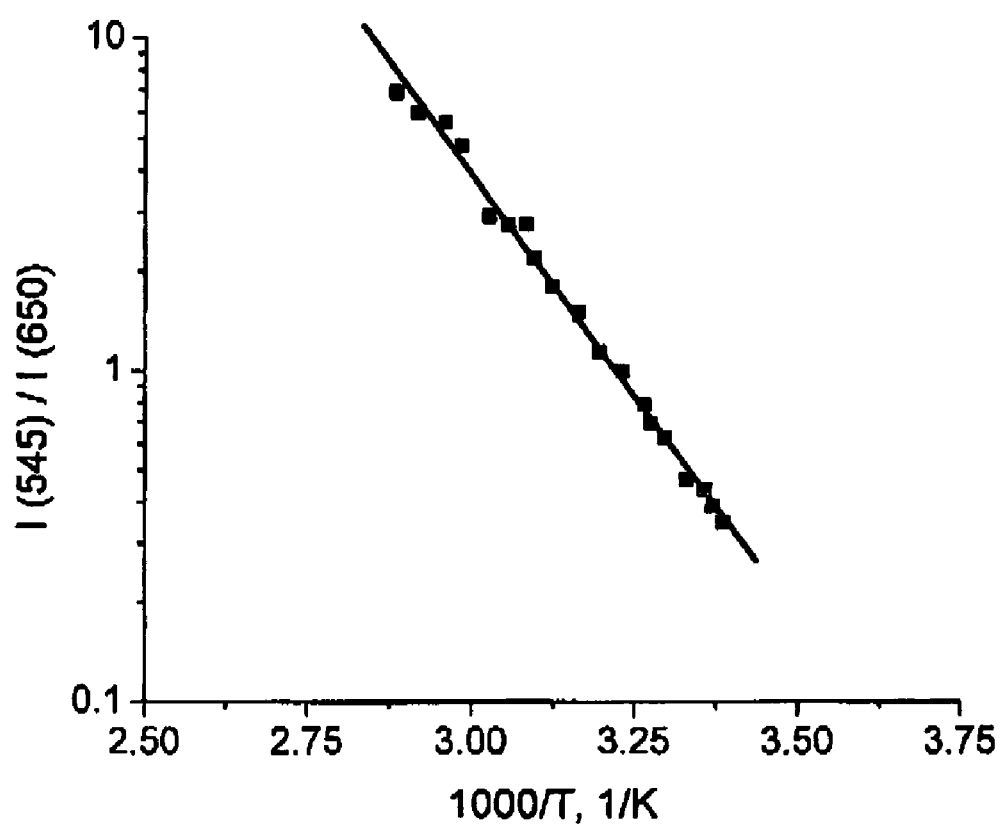
Figure 2:
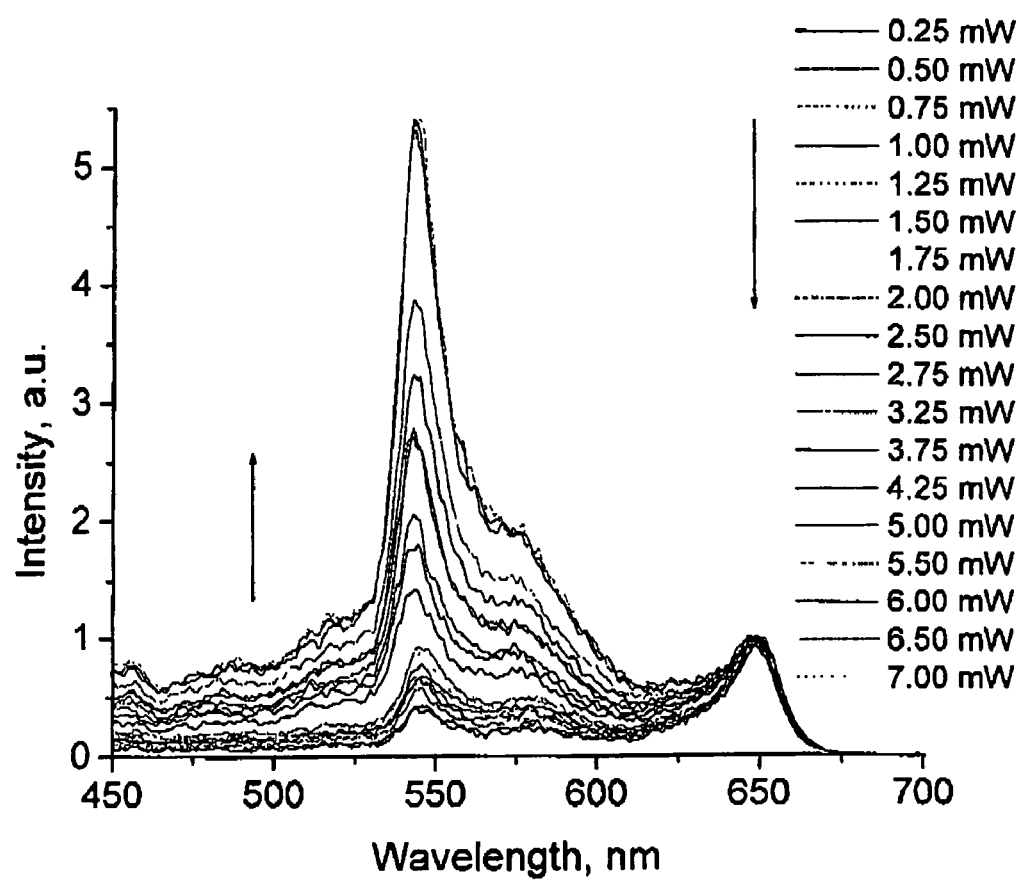
Figure 3A:
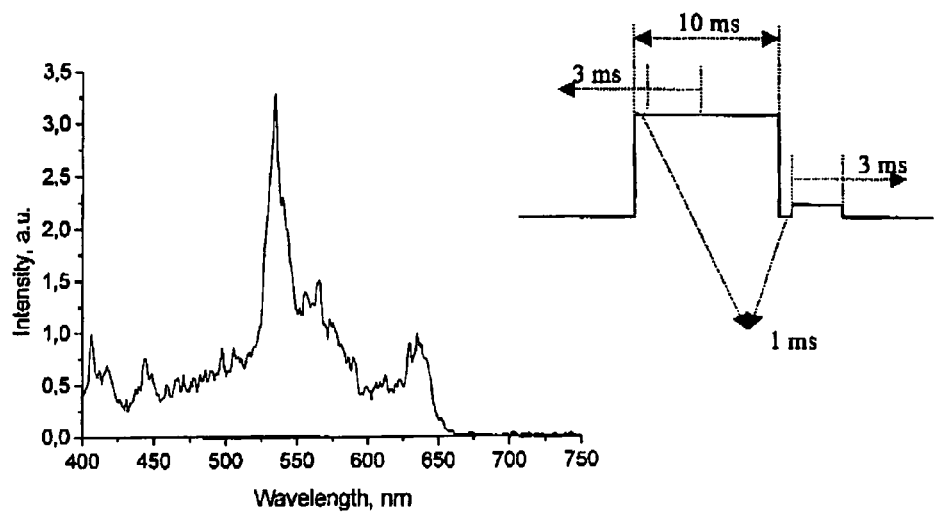
Figure 3B:
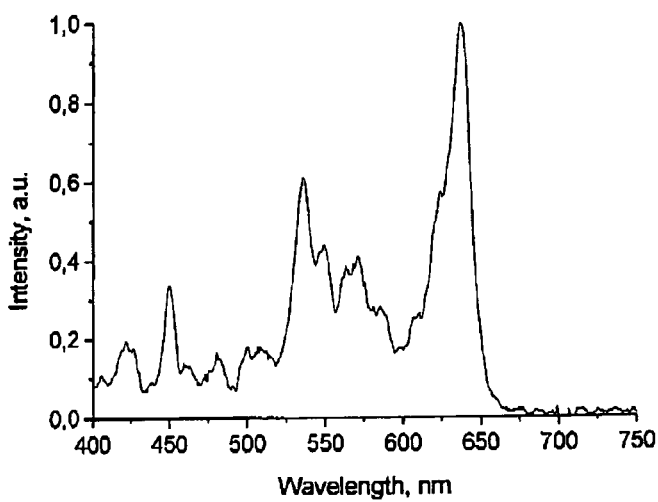
Figure 4:
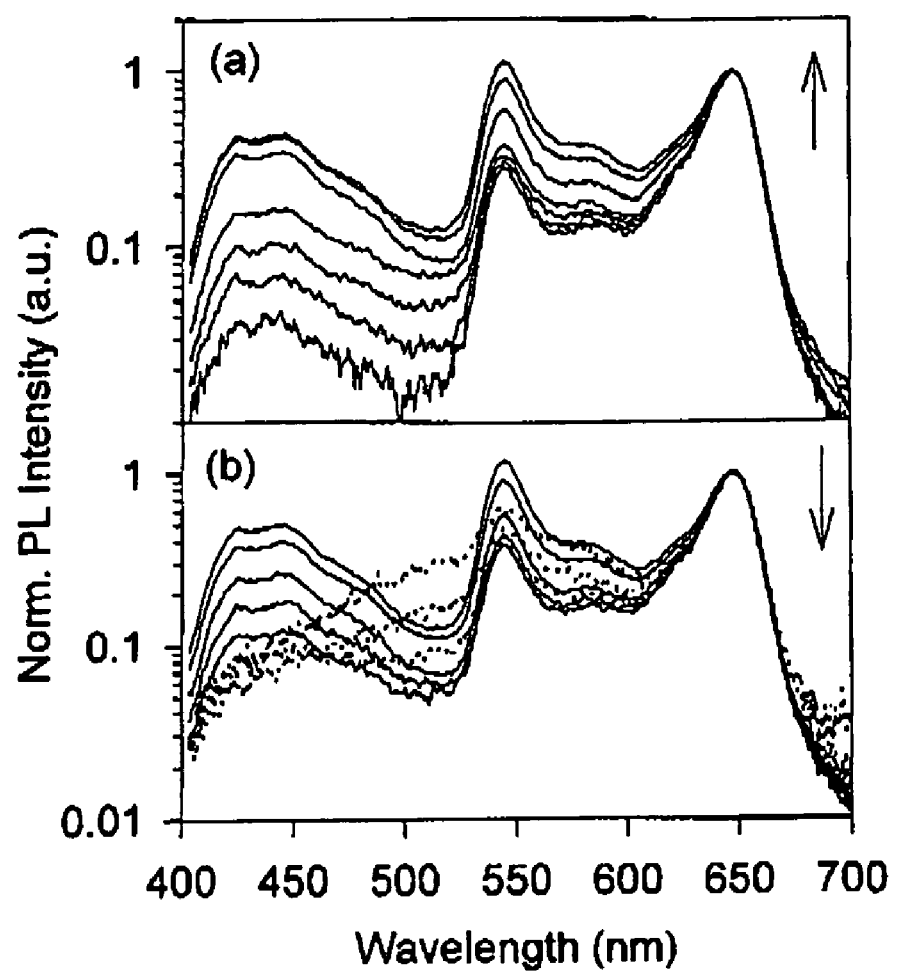

FIG. 1a shows a possible molecular thermometer molecule, in this case platinum octaethyl porphyrin (PtOEP), FIG. 1b shows a layered structure containing a molecular heater layer and a molecular thermometer layer, using PtOEP as a molecular thermometer, FIG. 1c shows the dependence of the emission of the PtOEP dispersed in polystyrene (10 wt. %), for calibration purposes, FIG. 1d shows the dependence of the fluorescence intensity ratio $I_{545}/I_{650}$ on the temperature which can be used as a calibration curve, FIG. 2 shows the dependence of the emission of the sample, of FIG. 1b on the power of the irradiating beam (405 nm), FIG. 3 shows emission spectra of the sample of FIG. 1b and examples 1 and 2, when excited with a specific excitation profile, after different pulses (FIGS. 3a and b), and FIG. 4 shows the delayed fluorescence spectra of a sample containing PtOEP in a strongly fluorescent matrix, with increasing (FIG. 4a) and decreasing laser power (FIG. 4b).

Figure 5A:
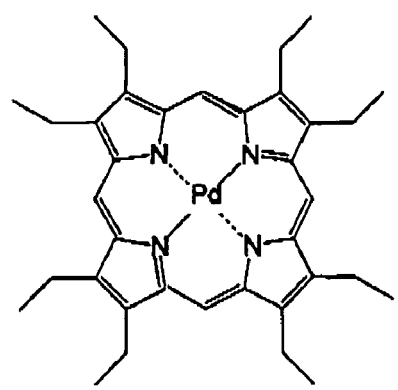
Figure 5B:
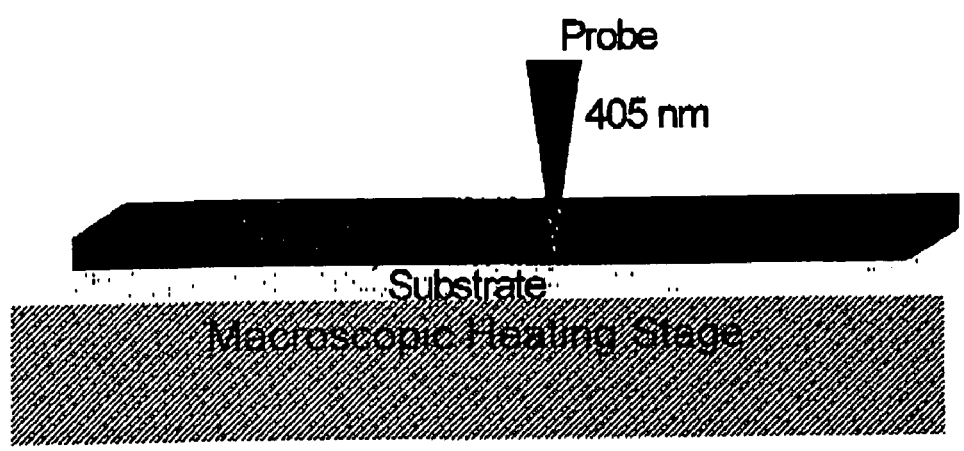
Figure 5C:
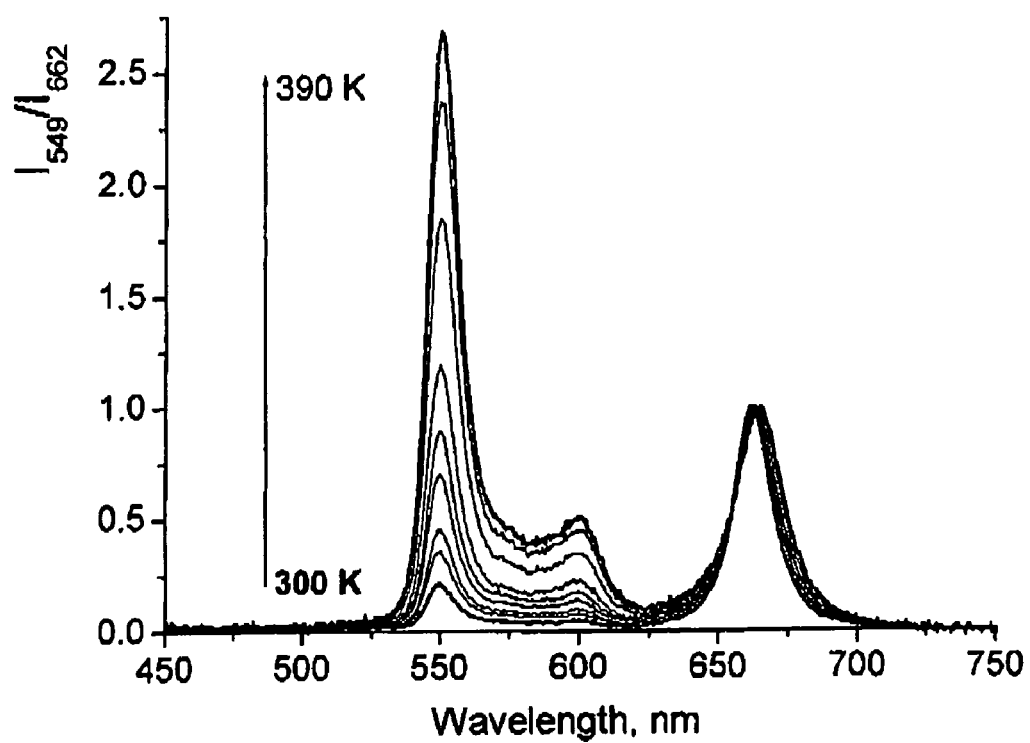
Figure 5D:
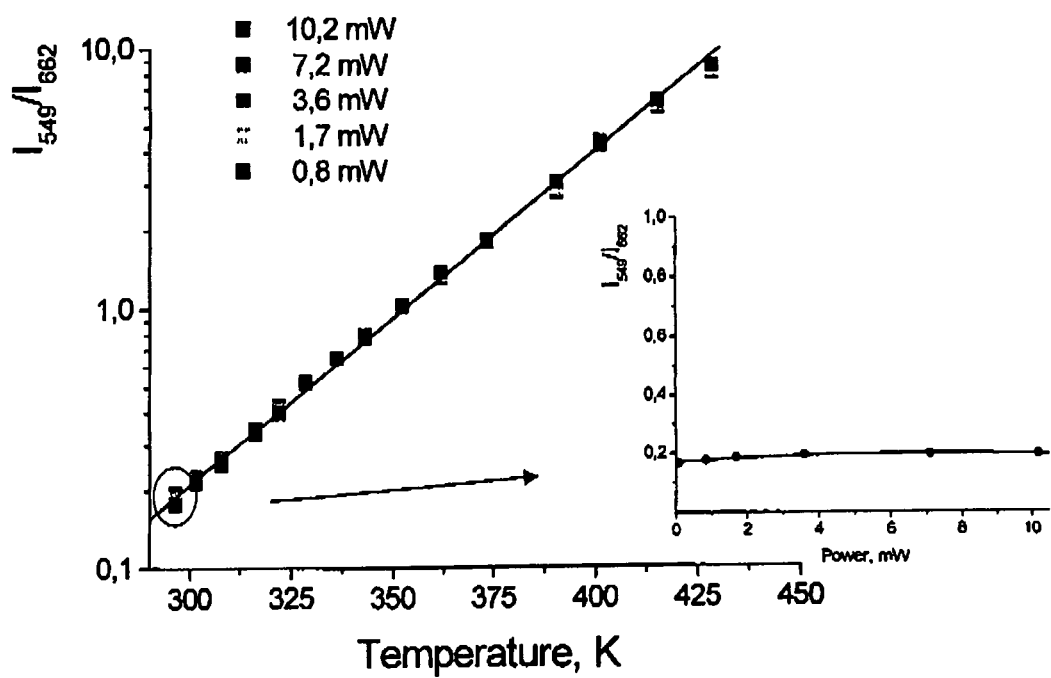
Figure 6A:
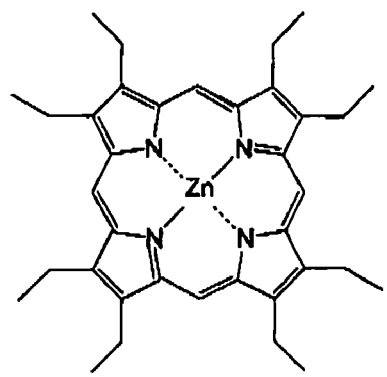
Figure 6B:
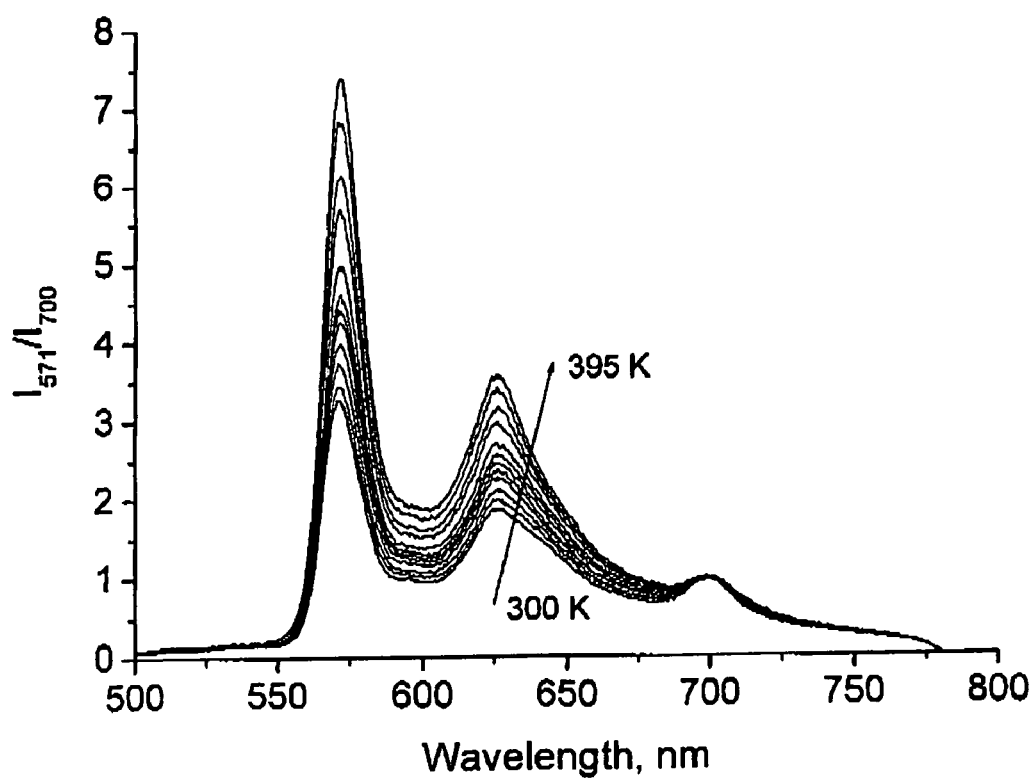
Figure 6C:
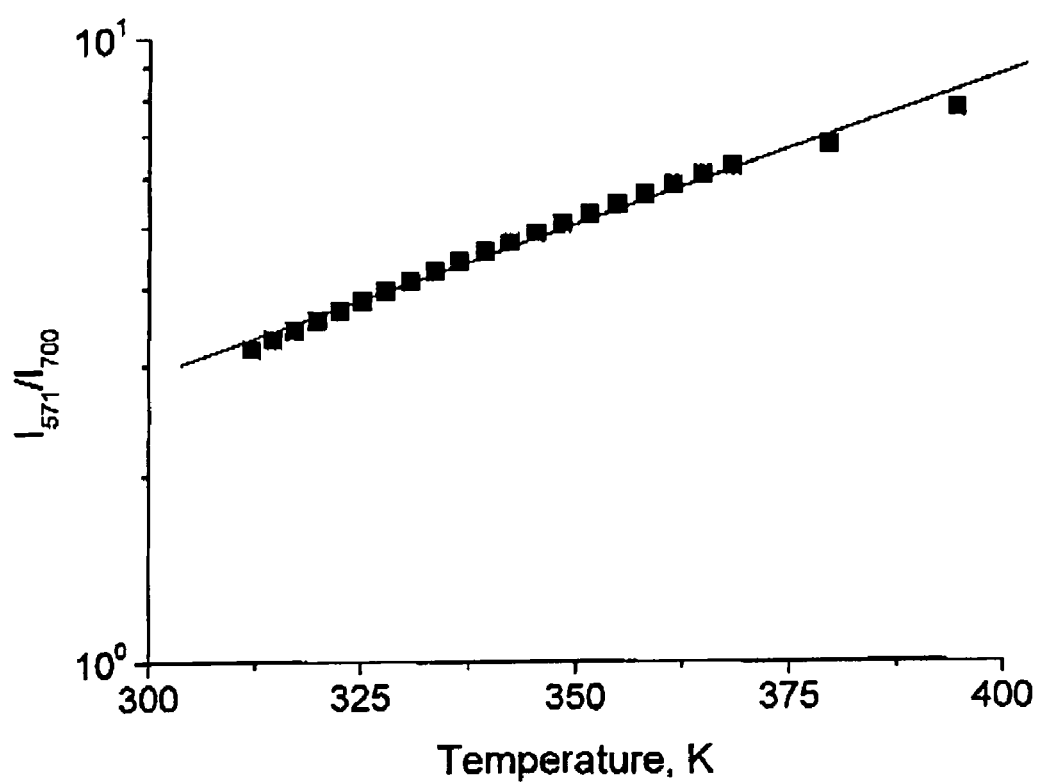
Figure 7A:
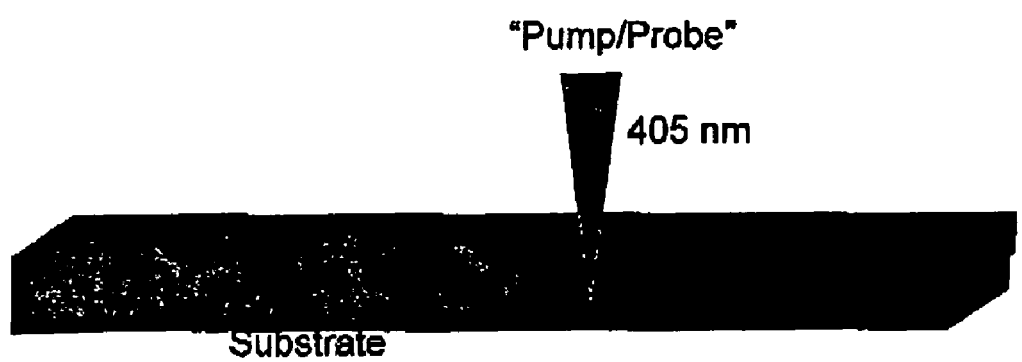
Figure 7B:
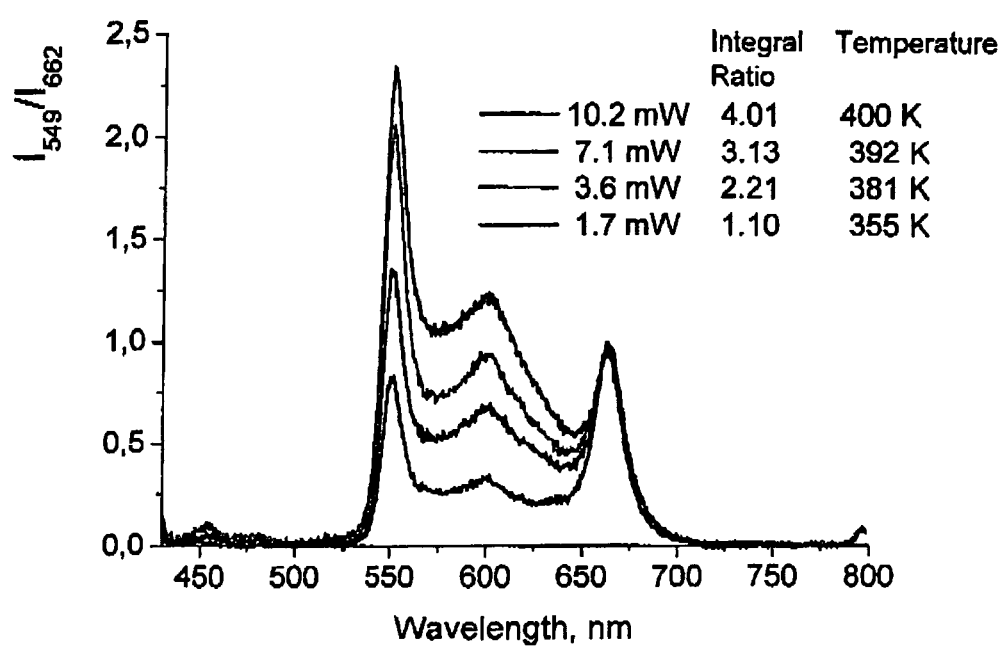
Figure 8A:
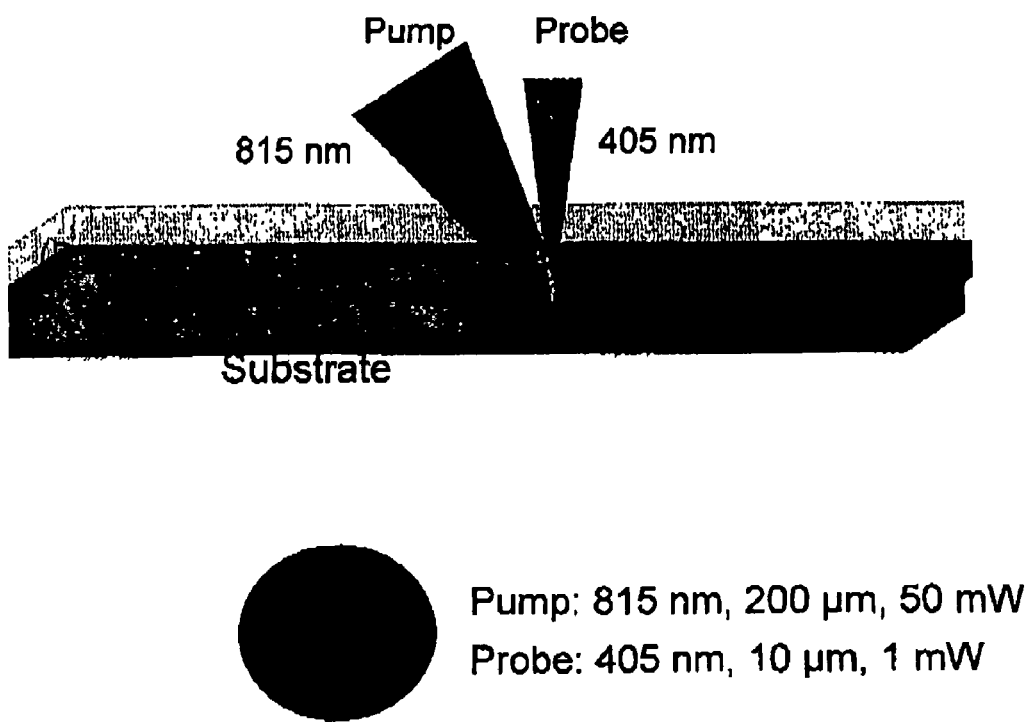
Figure 8B:
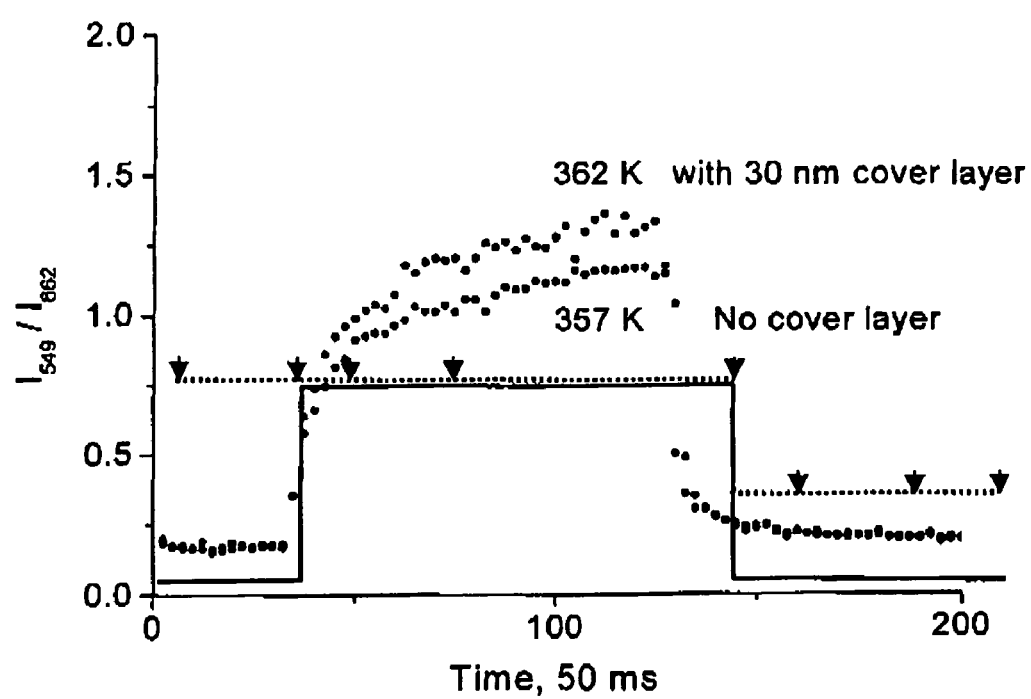

FIG. 5a shows the structure of palladium octaethyl porphyrin (PdOEP) which is a possible molecular thermometer according to the present invention, FIG. 5b shows the arrangement of a thermometer layer on a substrate wherein the temperature is determined ("probed") by irradiating by a 405 nm laser diode using continuous wave operation mode, FIG. 5c shows the temperature dependence of the emission intensity ratio for the two emission wavelengths 549 nm and 662 nm as measured with 1 mW 405 nm between 300 and 390 K, FIG. 5d shows a calibration curve for different optical powers, wherein the inset shows the dependence of the $I_{549}/I_{662}$ ratio for one temperature (in this case room temperature) on the power, FIG. 6a shows the structure of zinc octaethyl porphyrin (ZnOEP) which is a possible molecular thermometer according to the present invention, FIG. 6b shows the temperature dependence of the emission intensity ratio for the two emission wavelengths 571 nm and 700 nm as measured with 1 mW 405 nm between 300 and 395K, FIG. 6c shows a calibration curve using the ratio $I_{571}/I_{700}$ for a laser power 1 mW used for the probing beam, FIG. 7a shows the structural arrangement of a thermometer layer and a heater layer on a substrate wherein the temperature is determined using an identical wavelength for photo excitation of the heater layer ("pumping") and the thermometer layer ("probing"), FIG. 7b shows the dependence of the emission characteristics of the structural sample arrangement of FIG. 7a on the power of irradiation, FIG. 8a shows the structural sample arrangement for an experiment, wherein the wavelength for photoexcitation of the heater layer ("pumping") is different from the wavelength for photoexcitation of the thermometer layer ("probing"), FIG. 8b shows various scans before, during and after optical heating in the multi-layer system of FIG. 8a.

The following examples are intended to describe the invention by way of illustration and are in no way intended to be understood as limiting the invention.

EXAMPLE 1

Calibration

Platinum octaethyl porphyrin (PtOEP), the structure of which is shown in FIG. 1a was dispersed in polystyrene (10 wt. %) and was used as a molecular thermometer, forming a molecular thermometer layer. As a molecular heater a photoaddressable polymer was used, forming a molecular heater layer. Both layers were arranged as is shown in FIG. 1b. The sample, shown in FIG. 1b, was irradiated by a blue laser diode using an excitation beam of 405 nm in continues wave operation mode (300 ms integration time). For calibration purposes, the optical density of layer 1, where the molecular heater molecules are distributed is OD=1 at 405 nm. The sample is heated macroscopically on a hot stage so that temperature can be measured externally and a calibration curve can be made. For these measurements a non-focussed beam with a power of 0.12 mW was used, such that it was a low enough not to influence the temperature at the irradiated spot. FIG. 1b shows the structure of the measured samples: Layer 1 which was deposited on a glass substrate contains the molecular heater molecules which are dispersed in matrix, and has an $OD_{405}$ nm=1. Layer 2 which was deposited on top of layer 1 contains the molecular thermometer molecules (PtOEP) dispersed in a matrix. On top of layer 2 there is a relatively thick (1-2 µm) transparent layer of silicon nitride or LiF, and the sample is sealed under argon using a second glass substrate.

FIG. 1c shows the temperature dependence of the emission of the PtOEP which is dispersed in polystyrene. The figure shows that the intensity of the band at 545 nm is extremely dependent on the temperature of the sample, thus allowing the use of the fluorescence intensity ratio at 545 nm vs. 650 nm as a parameter for temperature measurement, which can be seen in the calibration curve in FIG. 1d.

EXAMPLE 2

Determination of Temperature

FIG. 2 shows the dependence of the emission of the sample which is the same as described in example 1, except for that this time the sample is heated by the irradiating beam, with the temperature thus achieved depending on the power of the beam of 405 nm which has been focussed on a spot with a diameter of 5 μm. The irradiation was for 300 ms. As can be seen, the ratio of fluorescence intensity at 545 nm vs. fluorescence intensity at 650 nm ($I_{154}$ nm/$I_{650}$ nm) depends very strongly on the irradiation power up to 6 mW which corresponds to $3 \times 10^7$ mW/cm$^2$ thus demonstrating the possibility of determining the temperature where a sample is photoexcited and thereby heated. The intensity ratio between e. g. the two wavelengths 545 nm and 650 nm at different irradiation powers illustrates the temperature change which is detected on a ms scale in situ. This example shows the high resolution that can be achieved by using a focussed beam, the resolution of which is only diffraction limited. The timescale and the spatial resolution used in this example are limited by only the specific set-up. The described high temporal and spatial resolution can be achieved in a high precision optical set-up (like for example the set-ups for DVD and CD recording) and using suitable pulsed excitation and time resolved detection (see also example 4).

EXAMPLE 3

Temporal Distribution Detecton of the Thermal Profile.

In this example the samples are the ones described in example 1 and 2. The excitation is done with the pulse profile shown in the inset of FIG. 3a, wherein pulse power is plotted as a function of time.

The 10 ms pulse had power of 7 mW. The emission of the thermometer molecules was measured when excited by the beginning of this pulse in a 3 ms window. The spectrum is shown in a) (a.u.=arbitrary units). The spectrum of the thermometer in a 3 ms window excited by the second pulse with power 300 μW was measured 1 ms after the 10 ms high-power pulse, as is shown in b). The temperature of the spot was 60° C. integrated over the 3 ms high-power excitation and was back to 30° C. 1 ms after the end of this high power pulse.

This example only illustrates the possibilities for thermal profile distribution measurements on a ms scale but it is envisaged by the inventors that this is not a limitation inherent to the inventive method. Instead, using suitable excitation profiles and emission detection techniques, thermal profile distributions on a us scale can be measured.

EXAMPLE 4

Temperature Determination in a Fluorescent Matrix

This example shows the possibility for temperature measurement in strongly fluorescent matrices using a gated detection technique. Here the thermometer molecules of PTOEP are distributed (10 wt. %) in a polyfluorene (PF) matrix. The PF is a strongly fluorescent polymer with exited state lifetime on the scale of ps.

In FIG. 4 the delayed fluorescence spectra of a 10% by weight blend of PtOEP in PF, measured in a 2 ns window 1.5 ns after excitation, normalised to the 650 nm band are shown. Figure a) Laser power increasing from 0.1 mW to 11 mW (from bottom to top). Figure b) Laser power decreasing from 11 mW to 0.1 mW (au.=arbitrary units, PL intensity=luminescence intensity). The dotted lines show the spectra recorded at 0.1 mW, 0.2 mW and 0.5 mW (relative fluorenone (PF defect-sites) emission increasing with decreasing laser power). The fluorescence was excited by a 80 MHz mode-locked frequency doubled titanium-saphire laser operating at 380 nm and was focussed on the sample in ca 100 μm diameter spot. The detection was done by a CCD spectrometer. The sample was mounted in a helium cryostat. In this case the heater molecules were the polyfluorene molecules (absorption max. 380 nm).

EXAMPLE 5

Calibration for Thermometer Layer with Palladium Octaethyl Porphyrin (PdOEP) Thermometer Molecules PdOEP, the structure of which is shown in FIG. 5a was dispersed (1 wt. %) in polysterene (PS) and was used as a molecular thermometer, forming, together with the PS matrix, a molecular thermometer layer. For the power calibrations the samples the thermometer layer was deposited directly on the glass substrate. The layers in the samples were arranged as shown in FIG. 5b. The thermometer layer was prepared by spincoating of a solution containing PdOEP and PS (PdOEP concentration vrs PS was 1 wt. %). The samples were than transferred in the measurements chamber and all measurements were done in dynamic vacuum of $10^{-5}$ mbar. The samples, as shown in FIG. 5b were irradiated by 405 nm laser diode using continuous wave operation mode (integration time 50 ms). The samples were heated macroscopically on a hot stage so that temperature can be measured externally and a calibration curve can be made.

For these "power calibration measurements" the response of the thermometer layer was measured at the different temperatures with 5 different optical powers –0.8, 1.7, 3.6, 7.2 and 10.2 mW.

FIG. 5c shows the temperature dependence of the emission intensity ratio for the two emission wavelengths 549 nm and 662 nm as measured with 1 mW 405 nm between 300 and 390 K. The figure shows that the ratio of the intensities at 549 and 662 nm is extremely dependent on temperature of the sample, thus allowing the use of this emission intensity ratio at 549 vs, 662 as a parameter for temperature measurement This can be seen in FIG. 5d where a calibration curve for the above-mentioned 5 optical powers is shown. In the inset the dependence of the above mention ratio for one temperature (room temperature) on the power used is shown.

EXAMPLE 6

Calibration for Thermometer Layer with Zinc Octaethyl Porphyrin (ZnOEP) Thermometer Molecules ZnOEP, the structure of which is shown in FIG. 6a was dispersed (1 wt. %) in polysterene (PS) and was used as a molecular thermometer, forming, together with the PS matrix, a molecular thermometer layer. For the power calibrations the samples the thermometer layer was deposited directly on the glass substrate. The layers in the samples were arranged as shown in FIG. 5b. The thermometer layer was prepared by spincoating of a solution containing ZnOEP and PS (ZnOEP concentration vrs PS was 1 wt. %). The samples were than transferred in the measurements chamber and all measurements were done in dynamic vacuum of 0-5 mbar.

The samples, as shown in FIG. 5b were irradiated by 405 nm laser diode using continuous wave operation mode (integration time 50 ms). The samples were heated macroscopically on a hot stage so that temperature can be measured externally and a calibration curve can be made.

The samples, having a structure as shown in FIG. 5b were irradiated by 405 nm laser diode using continuous wave operation mode (integration time 50 ms). The samples were heated macroscopically on a hot stage so that temperature can be measured externally and a calibration curve can be made.

FIG. 6b. shows the temperature dependence of the emission intensity ratio for the two emission wavelengths 571 nm and 700 nm as measured with 1 mW 405 nm between 300 and 395 K.

FIG. 6c shows a calibration curve using the ratio $I_{571}/I_{700}$ for laser power 1 mW used for the probing beam.

EXAMPLE 7

Determination of Temperature when the Beam Photoexcitation of the Heater Layer (Heating or Pump Wavelength) and the Wavelength for Excitation of the Thermometer Layer (Probe Wavelength) are Same −405 nm The structure of the samples for these experiments is as shown in FIG. 7a. The heater layer, which is deposited on a glass substrate, contains the molecular heater molecules dispersed in a matrix and has an optical density (OD) of ca. 1 for 405 nm. The thermometer layer is deposited on top of the heater layer contains the molecular thermometer molecules PdOEP (1 wt. %) dispersed in a matrix of polystyrene. The measurements are done under $10^{-5}$ mbar dynamic vacuum.

FIG. 7b shows the dependence of the emission of the above-described sample on the power. In this experiments, since the sample has heater layer, the heating is done by the irradiating beam (i.e. locally), with the temperature rise thus achieved depending on the power of the beam of 405 nm which was focused on a spot with diameter 10 μm. The irradiation/integration time was for 50 ms. As can be seen, the ratio $I_{549}/I_{662}$ depends very strongly on the irradiation power due to the presence of a heater layer (in contrast to the power calibration samples) up to 10.2 mW. This demonstrates the possibilities for all-optically determining the temperature in samples with heater layers:

The heater layer is photoexcited and as a result its temperature increases (it is heated)

By detecting the emission of the thermometer layer on top of the heater layer (it is excited by the same wavelength) to measure the temperature at the irradiated spot).

The spatial (10 μm) and time (50 ms) resolutions are limitations which are only typical for the particular set-up used. In different set-ups the present inventors have already achieved time resolution on the μs-scale. The same comments apply as in Example 2.

EXAMPLE 8

Determination of Temperature when the Wavelength for Photoexcitation of the Heater Layer (Heating or Pump Wavelength) and the Wavelength for Excitation of the Thermometer Layer (Probe Wavelength) are Different The sample structure and the irradiation scheme are shown in FIG. 8a. The heater layer, which is deposited on a glass substrate, has an optical density (OD) of ca. 1 for 815 nm. The thermometer layer is deposited on top of the heater layer and contains the molecular thermometer molecules PdOEP (1 wt. %) dispersed in a matrix of polystyrene. Samples with and without 30 nm insulating transparent cover layer were investigated and compared. The measurements are done under $10^{-5}$ mbar dynamic vacuum.

In these experiments, since the samples have heater layers, the heating is done by the irradiating beam (i.e. locally), with the temperature rise thus achieved by irradiation with a pump beam of 815 nm which was focused on a spot with diameter 200 μm (FIG. 8a). The temperature in the thermometer layer was probed by exciting this layer with a probe beam of 405 nm, 1 mW. The probing integration time was 50 ms. The probing laser is switched on at time 0 and the ratio $I_{549}/I_{662}$ is measured further on every 50 ms. The pump laser is switched at the 650 ms, kept on for 2 s and switched off and the temperature scan continues for further 1350 ms. The ratios measured during this experiments are shown in FIG. 8b for samples with and without 30 nm insulating transparent cover layer. The registered ratios difference corresponds to a difference of 5 K in both systems at the end of the optical heating periods.

This example demonstrates the possibilities for all-optically determining the temperature in samples with heater layers using two different wavelengths for heating and probing the temperature:

The heater layer is photoexcited and a result its temperature increases (it is heated) using an 815 nm beam By detecting the emission of the thermometer layer on top of the heater layer (it is excited by a second, probe beam of 405 nm) to measure the temperature inside the irradiated with 815 nm spot.

This example as well the one before directly illustrates the possibilities to determine (introduce thermal energy, i.e. heat, and measure together) the temperature in multilayer systems, i.e. to very precisely adjust and control it.

This offers and illustrates the following advantages (as claimed by the invention):

To all-optically determine the temperature in very thin layers (even under 20 nm)

To all-optically determine the temperature very locally (diffraction limited only) in multilayer systems with ability to probe in any desired position as far as it contains a thermometer layer The spatial (10 μm) and time (50 ms) resolutions are limitations which are only specific for the particular set-up used. In different set-ups the present inventors have already achieved a time resolution on the μs-range. The same comments apply as in Example 2.

The features of the present invention disclosed in the specification, the claims and/or in the accompanying drawings, may, both separately and in any combination thereof, be material for realizing the invention in various forms thereof.

The invention claimed is:

1. A method of determining a temperature in a system, said system comprising a molecular heater fraction and a molecular thermometer fraction, each of the fractions being integrated into a matrix, wherein said method comprises the following steps:

photoexciting the molecular heater fraction to heat said system, photoexciting the molecular thermometer fraction, measuring emission of radiation from the molecular thermometer fraction, determining a temperature of the system based on said measured emitted radiation, wherein said molecular heater fraction is different from said molecular thermometer fraction and does not form part thereof, and vice versa.

2. The method according to claim 1, wherein said molecular heater fraction comprises a first chemical species or first group of chemical species, and said molecular thermometer fraction comprises a second chemical species or a second group of chemical species, and wherein said first chemical species or first group of chemical species is different from said second chemical species or said second group of chemical species.

3. The method according to claim 1 characterized in that the molecular heater fraction and the molecular thermometer fraction are integrated into a common matrix.

4. The method according to claim 1, characterized in that the molecular heater fraction is integrated into a matrix and forms a molecular heater layer and the molecular thermometer fraction is integrated into a matrix and forms a molecular thermometer layer.

5. The method according to claim 4, characterized in that the system comprises at least one molecular heater layer and at least one molecular thermometer layer.

6. The method according to claim 5, characterized in that the system comprises two or more molecular heater layers and two or more molecular thermometer layers.

7. The method according to claim 6, characterized in that the molecular heater layers and the molecular thermometer layers are arranged in alternating order.

8. The method according to claim 4, characterized in that the molecular heater layer is a multilayer.

9. The method according to claim 1 characterized in that photoexciting the molecular heater fraction occurs by irradiating with wavelengths in the range from 220 nm to 1064 nm.

10. The method according to claim 9 characterized in that photoexciting the molecular heater fraction occurs by irradiating with wavelengths in the range from 300-700 mn.

11. The method according to claim 1, characterized in that the molecular thermometer fraction has emission characteristics that are temperature dependent.

12. The method according to claim 1, characterized in that the molecular thermometer fraction is provided: by molecules of one chemical species said molecules having two or more emission bands the population of which is temperature dependent, by molecules of two different chemical species each species having a temperature dependent emission that is different from that of the other species, and/or by molecules having thermally activated bands ("hot bands").

13. The method according to claim 1, wherein the emission of radiation from the molecular thermometer fraction is measured by measurements of luminescence intensity ratio.

14. The method according to claim 13, characterized in that the luminescence intensity ratio is the ratio of luminescence intensity at two different wavelengths.

15. The method according to claim 1, characterized in that the matrix is luminescent.

16. The method according to claim 1, characterized in that the lifetime(s) of the excited state(s) of the molecular thermometer fraction is (are) in the range from ps to µs.

17. The method according to claim 15, characterized in that the lifetime(s) of the excited state(s) of the molecular thermometer fraction is (are) greater than the lifetime(s) of the excited state(s) of the matrix.

18. The method according to claim 1, characterized in that the photoexcitation is caused by continuous excitation or by pulsed excitation.

19. The method according to claim 1, characterized in that the molecular heater fraction is provided by photosensitive molecules.

20. The method according to claim 1, characterized in that the photoexcitation is achieved using polarised radiation.

21. The method according to claim 1, characterized in that anisotropic molecules are used as the molecular heater/thermometer fraction.

22. The method according to claim 21, characterized in that the anisotropic molecules are photoaddressable.

23. The method according to claim 22, characterized in that the photoadressable anisotropic molecules are used as molecular heaters.

24. The method according to claim 1, characterized in that the molecular heater fraction is provided by a dye or combination of dyes selected from the group comprising any kind of conjugated small molecules and polymers with absorption suited to the wavelength of interest, in particular fulgides, diarylethenes, spiropyrans, azobenzenes, stylbenes, "donor-acceptor" groups and any polymer containing any of the aforementioned groups.

25. The method according to claim 1, characterized in that the molecular thermometer fraction is provided by a dye or combination of dyes selected from the group comprising porphyrins, metallo-porphyrins, fluorenes, and triphenyl-amines.

26. The method according to claim 1, comprising a calibration step:
Performing a calibration of said system by
photoexciting the molecular thermometer fraction,
measuring emission of radiation from the photoexcited molecular thermometer fraction at at least two different temperatures of the system,
measuring said at least two different temperatures of the system using an external means for measuring said temperatures, and
correlating said measured emitted radiation with its corresponding temperature of the system.

27. The method according to claim 26, characterized in that said emission of radiation from the photoexcited molecular thermometer fraction is measured at a plurality of temperatures of the system, and said plurality of temperatures of the system are measured using an external means for measuring said temperatures.

28. The method according to claim 26, characterized in that said external means for measuring said temperatures is a thermometer or a temperature probe or a temperature sensor.

29. The method according to claim 26, characterized in that, after correlating said measured emitted radiation with its corresponding temperature of the system, said correlation is represented as a plot of measured emitted radiation from the photoexcited molecular thermometer fraction versus temperature of the system.

30. The method according to claim 26, characterized in that said calibration step is performed prior to the step of photoexciting the molecular heater fraction as recited in claim 1, or after the step of determining a temperature of the system as recited in claim 1.

31. The method according to claim 26, characterized in that said calibration step is performed independently of any of the steps recited in claim 1.

32. The method according to claim 26, characterized in that said emission of radiation from the photoexcited thermometer fraction in said calibration is measured as luminescence intensity ratio, wherein said luminescence intensity ratio is the ratio of luminescence at two different wavelengths.

33. The method according to claim 1, characterized in that said photoexciting the molecular heater fraction occurs at the same wavelength as said photoexciting the molecular thermometer fraction.

34. The method according to claim 1, characterized in that said photoexciting the molecular heater fraction occurs at a different wavelength to said photoexciting the molecular thermometer fraction.

35. The method according to claim 34, characterized in that said wavelength for photoexciting said molecular heater fraction is greater than said wavelength for photoexciting step molecular thermometer fraction.

* * * * *